(12) United States Patent
Lee

(10) Patent No.: US 10,579,846 B2
(45) Date of Patent: Mar. 3, 2020

(54) AMOLED DRIVING DEVICE

(71) Applicant: Shenzhen China Star Optoelectronics Technology Co., Ltd., Shenzhen, Guangdong (CN)

(72) Inventor: Jih-Shiang Lee, Guandong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 323 days.

(21) Appl. No.: 15/565,476

(22) PCT Filed: Aug. 15, 2017

(86) PCT No.: PCT/CN2017/097475
§ 371 (c)(1),
(2) Date: Oct. 10, 2017

(87) PCT Pub. No.: WO2019/000603
PCT Pub. Date: Jan. 3, 2019

(65) Prior Publication Data
US 2019/0384959 A1    Dec. 19, 2019

(30) Foreign Application Priority Data
Aug. 15, 2017 (CN) .......................... 2017 1 0513256

(51) Int. Cl.
*G06K 9/00* (2006.01)
*G09G 3/3233* (2016.01)
(52) U.S. Cl.
CPC ....... *G06K 9/00006* (2013.01); *G09G 3/3233* (2013.01); *G09G 2310/0264* (2013.01)

(58) Field of Classification Search
CPC ............... G09G 3/3233; G09G 3/3291; H01L 27/3225; H01L 27/3227; H01L 27/3234;
(Continued)

(56) References Cited

U.S. PATENT DOCUMENTS 9,345,074 B2* 5/2016 Sato ..................... H05B 33/08
9,495,908 B2* 11/2016 Zhou .................... G09G 3/3233
(Continued)

FOREIGN PATENT DOCUMENTS

CN         104112120 A     10/2014
CN         105095877 A     11/2015
(Continued)

OTHER PUBLICATIONS

Office Action and Search Report for Chinese Patent Application No. 201710513256.6, dated May 3, 2018.
(Continued)

*Primary Examiner* — Sardis F Azongha

(57) ABSTRACT

Disclosed is an AMOLED driving device. The AMOLED driving device includes a fingerprint identification circuit and a detection identification circuit. The fingerprint identification circuit includes multiple fingerprint identification units provided in an active area. Each fingerprint identification unit corresponds to one pixel unit. The detection identification circuit is used to sense and compensate a current flowing through an OLED element and to analyze and process a signal outputted by the fingerprint identification circuit. The AMOLED driving device can reduce a bezel area of the display device and expands the active area.

14 Claims, 3 Drawing Sheets

(58) Field of Classification Search
CPC ... G06F 3/042; G06K 9/00006; G06K 9/0004
See application file for complete search history.

(56) References Cited

U.S. PATENT DOCUMENTS

| | | | | |
|---|---|---|---|---|
| 9,529,468 B2* | 12/2016 | Wu | ............ | G06F 3/042 |
| 9,570,004 B1* | 2/2017 | Fan | ............ | G09G 3/32 |
| 9,870,082 B2* | 1/2018 | Hu | ............ | G06F 3/0412 |
| 9,961,178 B2* | 5/2018 | Hong | ............ | G06K 9/00013 |
| 9,984,272 B2* | 5/2018 | Yang | ............ | G09G 3/32 |
| 2005/0285822 A1* | 12/2005 | Reddy | ............ | G06F 3/03542 |
| | | | | 345/76 |
| 2010/0231562 A1* | 9/2010 | Brown | ............ | G06F 3/0412 |
| | | | | 345/207 |
| 2012/0092302 A1* | 4/2012 | Imai | ............ | G06F 3/0412 |
| | | | | 345/175 |
| 2015/0302793 A1* | 10/2015 | In | ............ | G09G 3/3208 |
| | | | | 345/211 |
| 2015/0302801 A1* | 10/2015 | Tan | ............ | G06F 3/042 |
| | | | | 345/173 |
| 2018/0254288 A1* | 9/2018 | Ling | ............ | G09G 3/3233 |
| 2018/0373915 A1* | 12/2018 | Ling | ............ | G06K 9/0004 |

FOREIGN PATENT DOCUMENTS

| | | |
|---|---|---|
| CN | 105355171 A | 2/2016 |
| CN | 106409218 A | 2/2017 |
| CN | 106710521 A | 5/2017 |
| CN | 106898636 A | 6/2017 |
| KR | 101222542 B1 | 1/2013 |

OTHER PUBLICATIONS

Search Report and Written Opinion for International Application No. PCT/CN2017/097475, dated Mar. 29, 2018.

\* cited by examiner

AMOLED DRIVING DEVICE

CROSS-REFERENCE TO RELATED APPLICATIONS

The present application claims the priority of Chinese patent application CN 201710513256.6, entitled "AMOLED driving device" and filed on Jun. 29, 2017, the entirety of which is incorporated herein by reference.

FIELD OF THE INVENTION

The present disclosure relates to the technical field of display, and in particular, to an AMOLED driving device which comprises a fingerprint identification circuit in its active area.

BACKGROUND OF THE INVENTION

AMOLED (Active Matrix/Organic Light Emitting Diode) display panels are self-luminous display panels. AMOLED display panels can independently emit three colored lights (red, green, and blue) through multiple layers of organic compounds and thus realize color display. Compared with traditional liquid crystal panels, AMOLED display panels have characteristics of quick response speed, high contrast, wide angle of view, etc.

With development of AMOLED display technology, a fingerprint identification function has gradually become a necessary function of AMOLED display devices. The fingerprint identification function in the prior art is generally carried by a HOME button of a display device and the HOME button is generally put on a bezel of the display device. In other words, to realize the fingerprint identification function, an AMOLED display device is generally designed with sufficient bezel width to set a HOME button. Yet, a HOME button will expand the bezel area of a display device, which influences the active area and volume of the display device and makes it impossible to realize a full-screen design of the display device.

Thus, it is desired to provide a driving device that has a fingerprint identification function but does not affect an active area of a display device.

SUMMARY OF THE INVENTION

A technical problem to be solved by the present disclosure is that, in the prior art, a design of a fingerprint identification function in an AMOLED display device usually expands a bezel area of the display device and thus reduces an active area of the display device, which affects realization of a full-screen design of the display device.

In order to solve the above technical problem, the present disclosure provides an AMOLED driving device.

The AMOLED driving device comprises a fingerprint identification circuit and a detection identification circuit. The fingerprint identification circuit comprises multiple fingerprint identification units provided in an active area. Each fingerprint identification unit corresponds to one pixel unit. The detection identification circuit is used to analyze and process a signal outputted by the fingerprint identification circuit.

Preferably, the detection identification circuit is further used to sense and compensate a current flowing through an OLED element and/or a current flowing through a transistor which controls magnitude of the current flowing through the OLED element.

Preferably, the AMOLED driving device further comprises an OLED driving circuit. The OLED driving circuit comprises multiple OLED driving units and each OLED driving unit corresponds to one pixel unit.

The OLED driving unit comprises a first transistor and a second transistor. A gate of the first transistor is connected with a scanning line which is connected to the pixel unit to which the OLED driving unit corresponds. A drain of the first transistor is connected with a data line which is connected to the pixel unit to which the OLED driving unit corresponds. A source of the first transistor is connected with a gate of the second transistor. A drain of the second transistor is connected with a power supply terminal of a power supply circuit of the OLED. A source of the second transistor is connected with the OLED of the pixel unit to which the OLED driving unit corresponds.

Preferably, the AMOLED driving device further comprises a data driving signal source and a scan driving signal source. The data driving signal source is used to provide a data driving signal for the drain of the first transistor and the scan driving signal source is used to provide a scan driving signal for the gate of the first transistor.

Preferably, the OLED driving unit comprises a first control switch which is used to decide connection or disconnection of a route between an OLED element and the detection identification circuit.

Preferably, the fingerprint identification unit comprises an optical sensor, and a second control switch which is used to decide connection or disconnection of a route between the optical sensor and the detection identification circuit.

Preferably, an output terminal of the first control switch is respectively connected to an output terminal of the second control switch and an input terminal of the detection identification circuit.

Preferably, the AMOLED driving device further comprises a gate driving signal source. The gate driving signal source is used to decide turn-on and turn-off of the first control switch and the second control switch.

Preferably, a turn-on signal of the first control switch and a turn-on signal of the second control switch are reverse signals.

Preferably, the detection identification circuit comprises an OLED sensing and compensating circuit and a fingerprint analyzing and processing circuit.

Compared with the prior art, one or more embodiments of the above disclosure can have the following advantages or achieve the following beneficial effects.

In the AMOLED display device provided in the present disclosure, fingerprint identification circuits which are conventionally arranged in the HOME button in the prior art are arranged in the active area of the AMOLED display device, which gives the active area a fingerprint identification function. On one hand, the present disclosure expands identification area of the fingerprint identification function, enabling users to be identified by a fingerprint during touch operation. On the other hand, the present disclosure reduces functions of the HOME button, which, to some extent, reduces bezel area of the display device and expands the active area, helping realization of a design of full-screen display.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

At present, for protection of users' privacy and safety of display devices, some AMOLED display devices are designed with a fingerprint identification function which is used to identify users by verifying their fingerprints. In the prior art, the fingerprint identification function is generally carried by a HOME button of a display device and the HOME button is generally arranged on a bezel of the display device. Thus, to realize the fingerprint identification function, an AMOLED display device is generally designed with sufficient bezel width to set a HOME button. Yet, a HOME button usually expands a bezel area of a display device and reduces an active area of the AMOLED display device, which affects the volume of the display device and affects realization of a full-screen design of the display device.

Embodiment 1

In order to solve the above technical problem existed in the prior art, the present disclosure provides an AMOLED driving device.

Figure 1:
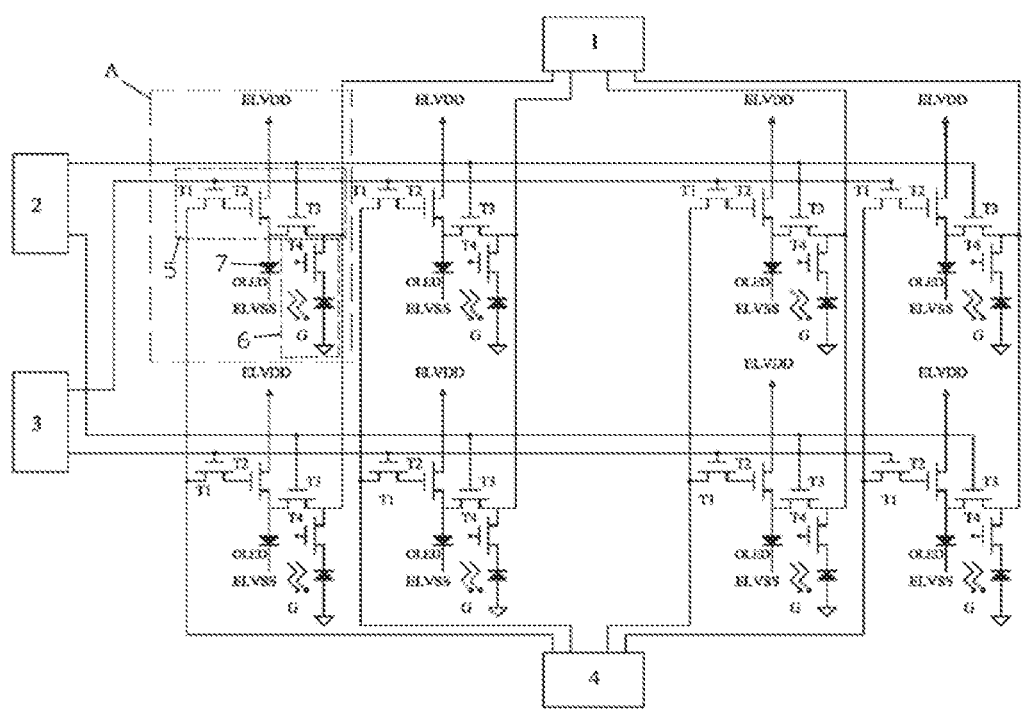
FIG. 1 schematically shows circuits of an AMOLED driving device in embodiment 1 of the present disclosure.

FIG. 1 schematically shows circuits of an AMOLED driving device in embodiment 1 of the present disclosure.

As shown in FIG. 1, the AMOLED driving device comprises a fingerprint identification circuit and a detection identification circuit 1. Different from the prior art, the fingerprint identification circuit comprises multiple fingerprint identification units 6 which are provided in an active area of the AMOLED driving device. Each fingerprint identification unit 6 corresponds to one pixel unit in the AMOLED driving device. The detection identification circuit 1 is used to sense and compensate a current flowing through an OLED element 7 of a pixel unit and/or a current flowing through a transistor which controls magnitude of the current flowing through the OLED element. The detection identification circuit I is connected with the fingerprint identification units 6 in the fingerprint identification circuit, and is used to analyze and process signals outputted by the fingerprint identification units 6 of the fingerprint identification circuit.

Specifically, the detection identification circuit 1 comprises an OLED sensing and compensating circuit and a fingerprint analyzing and processing circuit. The OLED sensing and compensating circuit is in communication with a path of the current flowing through the OLED element 7 and a path of the current flowing through the transistor which controls magnitude of the current flowing through the OLED element, so that the OLED sensing and compensating circuit can sense the current flowing through the OLED element 7 and/or the current flowing through the transistor which controls magnitude of the current flowing through the OLED element. The OLED sensing and compensating circuit can also confirm whether the OLED element 7 or the transistor which controls magnitude of the current flowing through the OLED element 7 has aged or deviated from element characteristics, by judging whether the current flowing through the OLED element 7 or the current flowing through the transistor which controls magnitude of the current flowing through the OLED element has reached a predetermined current value. If value of the currents flowing through the OLED element 7 is lower than the predetermined current value, it can be confirmed that the OLED element 7 or the transistor which controls magnitude of currents flowing through the OLED element 7 has aged or deviated from element characteristics. Under the circumstances, the OLED sensing and compensating circuit compensates a part of the OLED driving circuit that corresponds to the transistor, so that the OLED element 7 gives out light normally. Negative influences on display effects of the AMOLED display device can thus he avoided.

The fingerprint analyzing and processing circuit is connected with the fingerprint identification units 6 of the fingerprint identification circuit, and is used to analyze signals outputted by the fingerprint identification units 6 and process the signals.

In the AMOLED driving device of this embodiment, the fingerprint identification units 6 of the fingerprint identification circuit are arranged in the active area of the AMOLED driving device and each fingerprint identification unit 6 is corresponding to one pixel unit in the AMOLED driving device, by means of which the active area of the AMOLED driving device is provided a fingerprint identification function. Under the circumstances, the area of fingerprint identification is expanded, which at the same time protects users' privacy and makes it convenient for users to be identified by fingerprints.

In addition, the detection identification circuit 1 in the AMOLED driving device can be used not only to sense and compensate the current flowing through the OLED element 7 and the current flowing through the transistor which controls magnitude of the current flowing through the OLED element, but also to analyze and process signals outputted by the fingerprint identification units 6. The detection identification circuit 1 can detect whether the OLED element 7 and the transistor which controls the current flowing through the OLED element 7 work normally, by sensing the current flowing through the OLED element 7 and/or the current flowing through the transistor which controls magnitude of the current flowing through the OLED element. Specifically, if the OLED element 7 or the transistor has aged or deviated from element characteristics, the detection identification circuit 1 compensates a part of the OLED driving circuit that corresponds to the transistor, so as to ensure normal display of the AMOLED display device.

This embodiment incorporates the function of sensing and compensating the current flowing through the OLED element 7 and the current flowing through the transistor which controls magnitude of the current flowing through the OLED element and the function of analyzing and processing the signals outputted by the fingerprint identification units 6 into one circuit, which decreases the number of output leads in the active area and is conducive to increase of aperture ratio of the active area.

Embodiment 2

Figure 2:
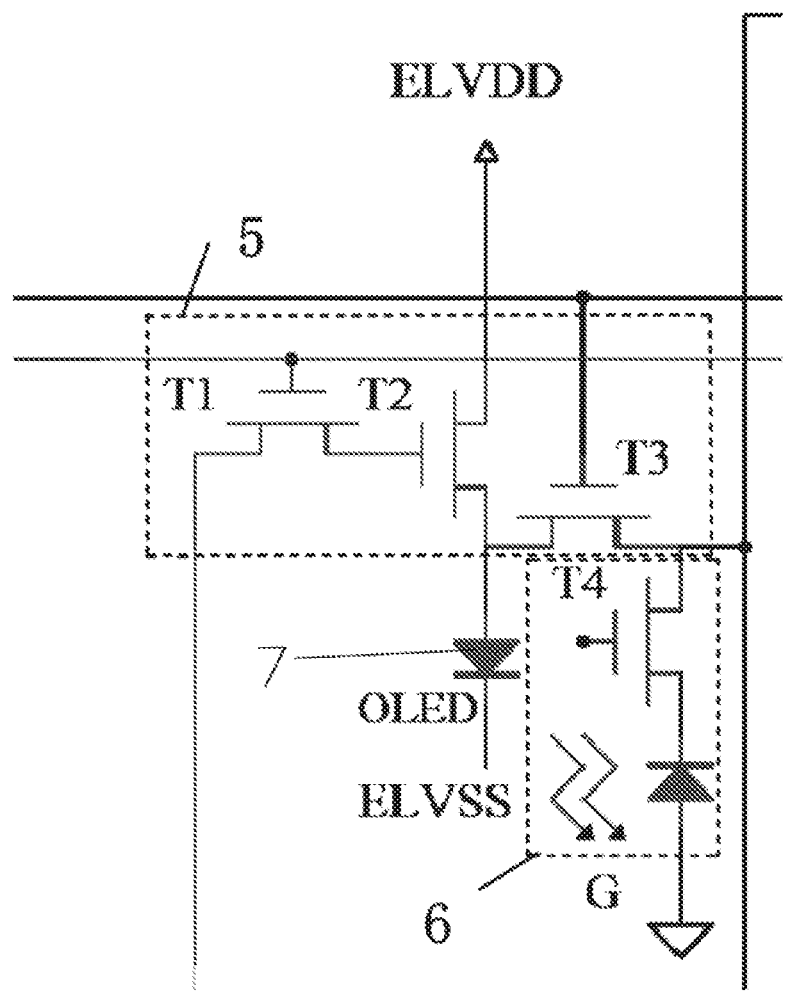
FIG. 2 schematically shows an enlarged view of circuits in area A of the AMOLED driving device in FIG. 1.

FIG. 2 schematically shows an enlarged view of circuits in area A of the AMOLED driving device in FIG. 1. As shown in FIG. 1 and FIG. 2, on the basis of Embodiment 1, the AMOLED driving device in this embodiment further comprises an OLED driving circuit, a data driving signal source 4, a scan driving signal source 3, and a gate driving signal source 2. The new-added OLED driving circuit, fingerprint identification units 6, data driving signal source 4, scan driving signal source 3, and gate driving signal source 2 will be illustrated below in detail.

Specifically, the data driving signal source 4 is used to provide a data driving signal for the OLED driving circuit and the scan driving signal source 3 is used to provide a scan driving signal for the OLED driving circuit. The OLED driving circuit comprises multiple OLED driving units 5. Each OLED driving unit 5 corresponds to one pixel unit of the AMOLED driving device, and is used to drive an OLED element 7 in the pixel unit. Since each fingerprint identification unit 6 in the fingerprint identification circuit also corresponds to one pixel unit, each pixel unit corresponds to one OLED driving unit 5 and one fingerprint identification unit 6 at the same time.

To further describe the OLED driving units 5 and the fingerprint identification units 6, only one OLED driving unit 5 and one fingerprint identification unit 6 which are associated with one certain pixel unit will be described below in detail. It shall be noted that other OLED driving units 5 in the OLED driving circuit and the fingerprint identification units 6 they correspond to are identical with the OLED driving unit 5 and the fingerprint identification unit 6 described below in terms of structure and the way of connection. FIG. 2 schematically shows specific circuits of one OLED driving unit 5 and one fingerprint identification unit 6 which are associated with one certain pixel unit.

Specifically, the OLED driving unit 5 comprises a first transistor T1, a second transistor T2, and a first control switch. The first transistor T1 and the second transistor T2 are used to drive the OLED element 7.

A gate of the first transistor T1 is connected with a scanning line which is connected to a pixel unit to which the OLED driving unit 5 corresponds. A drain of the first transistor T1 is connected with a data line which is connected to the pixel unit to which the OLED driving unit 5 corresponds. A source of the first transistor T1 is connected with a gate of the second transistor T2. The scan driving signal source 3 is connected with the scanning line and the data driving signal source 4 is connected with the data line. The scan driving signal source 3 is used to provide a scan driving signal for the gate of the first transistor T1, so as to decide an on state or an off state of the first transistor T1. The data driving signal source 4 is used to provide a data signal for the drain of the first transistor T1. A drain of the second transistor T2 is connected with a power supply terminal of a power supply circuit of the OLED element 7. A source of the second transistor T2 is connected with the OLED element 7 of the pixel unit to which the OLED driving unit 5 corresponds. While the first transistor T1 is in an on state, the data driving signal source 4 transmits an outputted data signal to the gate of the second transistor 12. By controlling the gate of the second transistor T2, the data driving signal source 4 controls magnitude of a current flowing through the OLED element 7 of the pixel unit to which the OLED driving unit 5 corresponds, so as to control luminance of the OLED element 7. The first control switch is used to decide connection or disconnection of a route between the OLED element 7 and the detection identification circuit 1. Preferably, the first control switch is a transistor T3. A gate of the transistor T3 is connected with the gate driving signal source 2, a drain of the transistor T3 is connected with the source of the second transistor T2, and a source of the transistor T3 is connected with the detection identification circuit I. The first control switch is used to decide connection or disconnection of the route between the OLED element 7 and the detection identification circuit, so that the detection identification circuit can better sense and compensate the current flowing through the OLED element 7 and/or the current flowing through the transistor which controls magnitude of the current flowing through the OLED element. The gate driving signal source 2 decides an on state or an off state of the transistor 13 by inputting a signal into the gate of the transistor 13. While the transistor T3 is in an on state, the OLED sensing and compensating circuit in the detection identification circuit 1 can sense, through 13, the current flowing through the OLED element 7 and/or the current flowing through the transistor which controls magnitude of the current flowing through the OLED element. If a value of the current flowing through the OLED element 7 is lower than the predetermined current value, the OLED sensing and compensating circuit compensates the current flowing through the to-be-sensed OLED element 7 and/or the current flowing through the transistor which controls magnitude of the current flowing through the OLED element, so as to ensure display effects of the AMOLED display device.

Further, the fingerprint identification units 6 comprise an optical sensor 8 and a second control switch. The optical sensor 8 is used to receive a light beam given out by the OLED element 7 and reflected back by a finger during the fingerprint identification of a user and to transform the optical signal received into an electrical signal. The second control switch is used to decide connection or disconnection of a route between the optical sensor 8 and the detection identification circuit 1, so as to ensure a better cooperation between the fingerprint identification unit 6 and the detection identification circuit 1 on fingerprint identification. Preferably, the second control switch is a transistor T4. A gate of the transistor T4 is connected with the gate driving signal source 2, a drain of the transistor T4 is connected with an output terminal of the optical sensor 8, and a source of the transistor T4 is connected with the detection identification circuit 1. The gate driving signal source 2 decides an on state or an off state of the transistor T4 by inputting a signal into the gate of the transistor T4. Preferably, the source of the transistor T4 is connected with the source of the transistor T3 and the source of the transistor T3 is connected with the detection identification circuit 1. In other words, the transistor T3 and the transistor T4 are connected with the detection identification circuit I through a same circuit. By way of this, the number of circuits in the active area can be decreased, which can reduce influences of the circuits in the active area on light transmittance of the active area and increase the aperture ratio of the active area.

It shall be noted that, while the first control switch and the second control switch are connected with the detection identification circuit 1 through the same circuit, a turn-on signal of the first control switch and a turn-on signal of the second control switch are reverse signals. Such arrangement helps to avoid simultaneous transmission of signals by the fingerprint identification unit 6 and the OLED driving unit 5 to the detection identification circuit 1 and thus avoids failure of the detection identification circuit 1 resulted therefrom. While the transistor T4 (the second control switch) is in an on state, the fingerprint analyzing and processing circuit of the detection identification circuit 1 can identify, through the transistor T4, a signal outputted by the optical sensor 8 and then process the signal, so as to realize fingerprint identification in the active area of the AMOLED display device.

Figure 3:
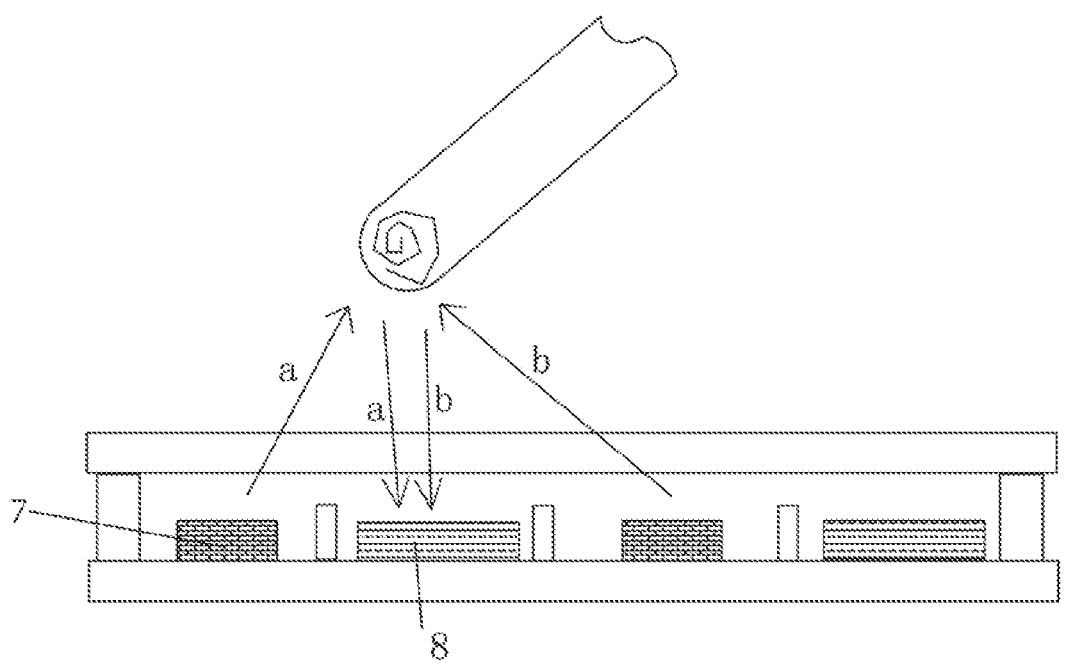
FIG. 3 schematically shows light paths of a fingerprint identification circuit during fingerprint identification in embodiment 2 of the present disclosure.

FIG. 3 schematically shows light paths of the fingerprint identification circuit during fingerprint identification in embodiment 2 of the present disclosure. Referring to FIG. 3, the fingerprint identification process of the AMOLED display device is as below. Firstly, while the AMOLED display device is identifying a user by a fingerprint, the OLED element 7 of the pixel unit in the active area gives out lights normally. In particular, an OLED element 7 of one pixel unit in the active area gives out a light beam a and a light beam b. The light beam a and the light beam b shine on the fingerprint and then are reflected. The optical sensor 8 in the fingerprint identification unit 6 detects the reflected light beam a and light beam b and transforms the optical signals detected into electrical signals. On the basis of the electrical signals, the gate driving signal source 2 sends a turn-on signal to the transistor T4 and a turn-off signal to the transistor T3. While the transistor T4 is turned on, the optical sensor 8 sends the electrical signals generated to the fingerprint analyzing and processing circuit of the detection identification circuit 1 and the fingerprint analyzing and processing circuit analyzes and processes these electrical signals.

The AMOLED driving device provided in this embodiment works as below. While the AMOLED driving device is identifying a user by a fingerprint, the gate driving signal source 2 sends a turn-off signal to the first control switch and a turn-on signal to the second control switch, so that the transistor T3 is in an off state and the transistor 14 is in an on state. At this moment, the optical sensor 8 receives light beams given out by the OLED element 7 and reflected back by the finger. The optical sensor 8 then transforms the optical signals into electrical signals, and sends the electrical signals to the fingerprint analyzing and processing circuit of the detection identification circuit 1. The fingerprint analyzing and processing circuit analyzes and processes these electrical signals. By way of this, the active area of the AMOLED driving device is given a function of fingerprint identification. Compared with the fingerprint identification function of the display devices in the prior art, the fingerprint identification function of the AMOLED driving device increases fingerprint identification area and make it easier for users to be identified by fingerprints while protecting the users' privacy.

While the OLED sensing and compensating circuit of the detection identification circuit 1 is sensing and compensating the OLED driving circuit, the scan driving signal source 3 sends a turn-on signal to the gate of the first transistor T1, enabling the first transistor T1 to be in an on state. In the meanwhile, the date driving signal source 4 sends a data signal to the first transistor T1 and then the first transistor T1 sends the data signal to the gate of the second transistor T2. The second transistor T2 is enabled to be in an on state and the power supply circuit begins to supply power to the OLED element. In addition, the gate driving signal source 2 sends a turn-on signal to the first control switch and a turn-off signal to the second control switch, enabling the transistor T3 to be in an on state and the transistor T4 to be in an off state. In this case, the OLED sensing and compensating circuit of the detection identification circuit 1 senses the current flowing through the OLED element 7 and/or the current flowing through the transistor which controls magnitude of the current flowing through the OLED element. If a value of the sensed current flowing through the OLED element 7 and/or a value of the sensed current flowing through the transistor is lower than the predetermined current value, it can be confirmed that the OLED element 7 or the transistor has aged or deviated from element characteristics. The detection identification circuit 1 will compensate the sensed currents by means of the first control switch, so as to avoid negative influences on display effects of the AMOLED display device due to the fact that the value of the current flowing through the OLED element is lower than the predetermined current value.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. An AMOLED driving device, comprising:
   an OLED driving circuit which comprises multiple OLED driving units, wherein
      each OLED driving unit corresponds to one pixel unit; and
      the OLED driving unit comprises:
         a first transistor, its gate connected with a scanning line which is connected to a corresponding pixel unit of the OLED driving unit, its drain connected with a data line which is connected to the corresponding pixel unit of the OLED driving unit, and its source connected with a gate of a second transistor;
         the second transistor, its drain connected with a power supply terminal of a power supply circuit of an OLED element and its source connected with an OLED element of a corresponding pixel unit of the OLED driving unit; and
         a first control switch, which is used to decide connection or disconnection of a route between an OLED element and the detection identification circuit; and
   a detection identification circuit, used to analyze and process a signal outputted by a fingerprint identification circuit, the fingerprint identification circuit, comprising:
      multiple fingerprint identification units provided in an active area, wherein each fingerprint identification unit corresponds to one pixel unit;
      an optical sensor; and
      a second control switch which is used to decide connection or disconnection of a route between the optical sensor and the detection identification circuit, wherein an output terminal of the first control switch is respectively connected to an output terminal of the second control switch and an input terminal of the detection identification circuit.

2. The AMOLED driving device according to claim 1, wherein the detection identification circuit is further used to sense and compensate a current flowing through an OLED element and/or a current flowing through a transistor which controls magnitude of the current flowing through the OLED element.

3. The AMOLED driving device according to claim 2, wherein the detection identification circuit comprises an OLED sensing and compensating circuit and a fingerprint analyzing and processing circuit.

4. The AMOLED driving device according to claim 1, further comprising a data driving signal source and a scan driving signal source, wherein the data driving signal source is used to provide a data driving signal for the drain of the first transistor and the scan driving signal source is used to provide a scan driving signal for the gate of the first transistor.

5. The AMOLED driving device according to claim 4, wherein the detection identification circuit comprises an OLED sensing and compensating circuit and a fingerprint analyzing and processing circuit.

6. The AMOLED driving device according to claim 1, further comprising a gate driving signal source, which is used to decide turn-on and turn-off of the first control switch and the second control switch.

7. The AMOLED driving device according to claim 6, wherein a turn-on signal of the first control switch and a turn-on signal of the second control switch are reverse signals.

8. The AMOLED driving device according to claim 7, wherein the detection identification circuit comprises an OLED sensing and compensating circuit and a fingerprint analyzing and processing circuit.

9. The AMOLED driving device according to claim 6, wherein the detection identification circuit comprises an OLED sensing and compensating circuit and a fingerprint analyzing and processing circuit.

10. The AMOLED driving device according to claim 1, wherein the detection identification circuit comprises an OLED sensing and compensating circuit and a fingerprint analyzing and processing circuit.

11. The AMOLED driving device according to claim 1, wherein the detection identification circuit comprises an OLED sensing and compensating circuit and a fingerprint analyzing and processing circuit.

12. The AMOLED driving device according to claim 1, wherein the detection identification circuit comprises an OLED sensing and compensating circuit and a fingerprint analyzing and processing circuit.

13. The AMOLED driving device according to claim 1, wherein the detection identification circuit comprises an OLED sensing and compensating circuit and a fingerprint analyzing and processing circuit.

14. The AMOLED driving device according to claim 1, wherein the detection identification circuit comprises an OLED sensing and compensating circuit and a fingerprint analyzing and processing circuit.

* * * * *